March 22, 1938. E. OETIKER 2,111,674
FLUID PRESSURE OPERATED BRAKE
Filed June 2, 1936
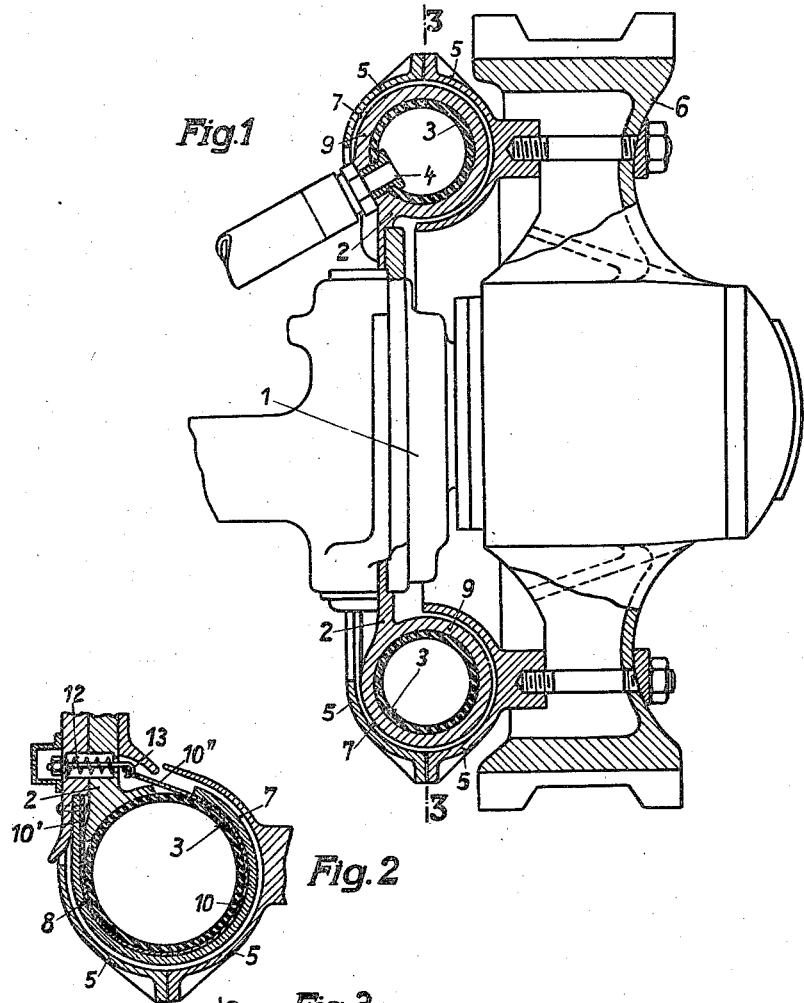
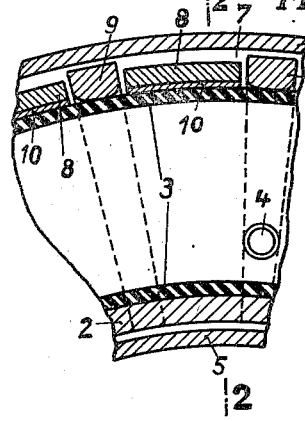
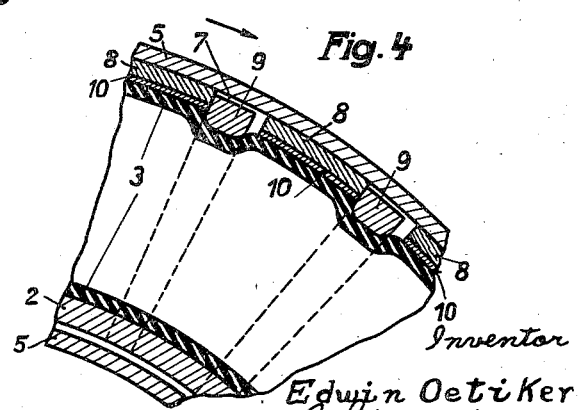
Inventor
Edwin Oetiker
By B. Singer
Attorney Patented Mar. 22, 1938

2,111,674

UNITED STATES PATENT OFFICE 2,111,674

FLUID-PRESSURE OPERATED BRAKE

Edwin Oetiker, Zurich-Altstetten, Switzerland

Application June 2, 1936, Serial No. 83,117
In Germany June 13, 1935

3 Claims. (Cl. 188—152)

This invention relates to fluid pressure operated brakes for motor cars and the like. It has already been proposed to provide brakes with an inflatable tube which presses braking elements against the surface of a brake drum. An essential drawback of these constructions is that they necessitate much room as only a small part of the inflatable tube is able to exert a braking action and also because the said inflatable tube is subjected during the brake action to high stresses and does therefore not possess great durability.

One object of this invention is to obviate these drawbacks by disposing a number of flexible braking elements around the inflatable tube of circular cross section, the one end of these elements being fixedly secured to a support and the other end being resiliently secured to the said common support.

Another object of this invention is to arrange on the common support for the braking elements abutments for the said braking elements, these abutments encircling the inflatable tube. During the braking operation the flexible braking elements abut against the said abutments thereby relieving the inflatable tube.

Referring to the drawing:

Fig. 1 is a sectional view of a wheel provided with a fluid pressure operated brake, Fig. 2 is a section on line 2—2 of Fig. 3, Fig. 3 is a section on line 3—3 of Fig. 1, Fig. 4 is a section on line 3—3 of Fig. 1 when the brake is operated.

Referring now to Fig. 1 of the drawing it will be noted that a common support 2 for the braking elements 8 is secured to the axle shaft 1. Within the said support 2 is disposed an inflatable circular tube 3 of resilient material which is connected to a conduit 4 for the pressure fluid, for instance compressed air. Tube 3 lies within brake drum 5 which is bolted to the wheel body 6 and which is provided with a braking surface 7 co-axial to the outer surface of tube 3. The flexible braking elements 8 are arranged between tube 3 and braking surface 7 and possess an almost circular cross section. Abutments 9 in the form of straps encircle the inflatable tube 3 and are fixedly secured to the support 2 and are disposed between two consecutive braking elements 8. The abutments 9 allow a radial movement of the braking elements 8 but they prevent a movement of the elements 8 along the tube 3 when the brake is operated because the said elements then abut against the said abutments.

Each braking element 8 is fixed to a steel band 10, the one end 10' of which is secured to the support 2 whereas the other end 10" is fixed to a bolt 13, the said bolt being resiliently borne in the common support 2 by means of a spring 12. Spring 12 tends to lift braking element 8 off the braking surface 7 but as soon as a compressed fluid, as for instance compressed air is introduced into the inflatable tube 3 the braking elements 8 are moved radially outwardly against the action of the spring 12.

Any suitable braking material can be used for the manufacture of the braking elements 8 if only it is capable to lie snugly against the braking surface 7. Inflatable tube 3 and conduit 4 for the compressed fluid necessitate only little room. The inflatable tube might have other cross sections, for instance a tube with rectangular cross section might also be used.

It is thought that the invention and many of its attendant advantages will be understood from the foregoing descriptions, and it will be apparent that various changes may be made in the form, construction and arrangement of the parts without departing from the spirit and scope of the invention or sacrificing all of its material advantages, the form hereinbefore described being merely a preferred embodiment thereof.

What I wish to secure by the U. S. Letters Patent is:

1. In a fluid pressure operated brake, a support, a brake drum, an inflatable tube carried by said support in cooperative relation to said drum, a plurality of flexible braking elements embracing said tube, means securing the ends of each braking element to said support, in virtue of which as said tube is inflated said elements will engage said drum, and fixed abutments secured to said support between adjacent braking elements, said abutments comprising straps embracing said inflatable tube.

2. In a fluid pressure operated brake, a support, a brake drum, an inflatable tube carried by said support in cooperative relation to said drum, a plurality of flexible braking elements embracing said tube, means securing the ends of each braking element to said support, in virtue of which as said tube is inflated said elements will engage said drum, said means including a resilient connection between each braking element and said support, fixed abutments secured to said support between adjacent braking elements, and said abutments comprising straps embracing said inflatable tube.

3. In a fluid pressure operated brake, a support, a ring-shaped inflatable tube, a plurality of flexible braking bands encircling said tube and spaced apart, means to connect the ends of said braking bands to said support, and annular straps encircling said tube and lying in the spaces between said braking bands and rigidly connected to said support, in virtue of all of which as said tube is inflated said braking bands will engage said drum and will be held against movement around the axis of said drum by said rigidly held annular straps.

EDWIN OETIKER.